United States Patent [19]

Kuhn et al.

[11] 3,983,460
[45] Sept. 28, 1976

[54] ENCLOSED CIRCUIT INTERRUPTER WITH IMPROVED FUSE ASSEMBLY

[75] Inventors: Edmund W. Kuhn; Jesse L. Uber, both of Pittsburgh, Pa.

[73] Assignee: Westinghouse Electric Corporation, Pittsburgh, Pa.

[22] Filed: Apr. 2, 1975

[21] Appl. No.: 564,576

[52] U.S. Cl. ................................. 317/114; 337/6; 317/103; 200/50 AA
[51] Int. Cl.² ......................................... H02B 1/18
[58] Field of Search ................ 337/6, 7; 200/50 AA, 200/301; 317/103, 114, 116

[56] References Cited
UNITED STATES PATENTS

| | | |
|---|---|---|
| 2,711,452 | 6/1955 | Spencer ............................ 200/301 |
| 3,043,934 | 7/1962 | Bodenschatz .......................... 337/7 |
| 3,274,356 | 9/1966 | Godfrey ......................... 200/50 AA |
| 3,621,339 | 11/1971 | Hodgson ............................. 317/114 |

Primary Examiner—Gerald P. Tolin
Attorney, Agent, or Firm—R. E. Converse, Jr.

[57] ABSTRACT

A network protector includes an automatic circuit breaker mounted in a metal enclosure and a fuse assembly externally mounted upon the enclosure. The fuse assembly includes a fuse housing of molded insulating material and a gasketed access plate providing a watertight enclosure for a fuse. Resiliently mounted studs are provided for connection to a fuse without cracking of the fuse housing due to misalignment between the studs and the fuse.

2 Claims, 8 Drawing Figures

ENCLOSED CIRCUIT INTERRUPTER WITH IMPROVED FUSE ASSEMBLY

CROSS-REFERENCES TO RELATED APPLICATIONS

This invention is related to U.S. Patent Application Ser. No. 564,574, entitled "Enclosed Circuit Interrupter With Door Mounted Control Handle Mechanism" filed Apr. 2, 1975 by W. Paul Matty and Alan G. McGuffie; U.S. Patent Application Ser. No. 564,573, entitled "Drawout Type Circuit Interrupter With Modular Construction" filed Apr. 2, 1975 by Edmund W. Kuhn, Joseph D. Findley, Jr., and J. L. Uber; U.S. Patent Application Ser. No. 564,575, entitled "Enclosed Circuit Interrupter With Interlocked Safety Barrier", filed Apr. 2, 1975 by Edmund W. Kuhn, Alan G. McGuffie, and W. Paul Matty; U.S. Patent Application Ser. No. 564,577, entitled "Drawout Type Circuit Interrupter With Interlocked Levering Mechanism" filed Apr. 2, 1975 by Edmund W. Kuhn and Alan G. McGuffie; and U.S. Patent Application Ser. No. 438,059, entitled "Gasket Assembly For Enclosed Electrical Apparatus" filed Jan. 30, 1974, by Edmund W. Kuhn. Each of the above-mentioned applications is assigned to the assignee of the present invention.

BACKGROUND OF THE INVENTION

1. Field of the Invention

The invention relates generally to electrical apparatus, and more particularly, to enclosed circuit interrupters with fuse protection.

2. Description of the Prior Art

In supplying the nation's energy needs, two primary objectives of the electric utility industry are safety and reliability. Since the late 1920's, the AC secondary network system has been used in downtown business districts and commercial areas to provide a high degree of service continuity. In the AC secondary network system, the secondary mains surrounding the area being served, such as a city block, are connected together to form a secondary network grid or mesh at low voltage from which the customer loads are viewed. The secondary network is supplied over a plurality of high-voltage transmission lines or feeders through network transformers. The transformers reduce the high-voltage necessary for transmission of electric energy to lower voltage suitable for distribution to customers. In the AC seconary network system, the failure of any one feeder will not cause interruption to service because the load will be supplied over the remaining feeders. When a failure, or fault, occurs in a high-voltage feeder or in one of its associated network transformers, the station end of the feeder, that is, the end closest to the generating station, is disconnected from the system by opening of the feeder circuit breaker. In addition, it is necessary that all network transformers on the failed feeder be disconnected from the network by some form of protective device to prevent power from the network from being fed back through the network grid and transformer to the fault. The automatic network protector was developed for this purpose. The network protector consists of a specially designed air circuit breaker with a closing and opening mechanism controlled by a network master relay and a network phasing relay. When the network protector is closed, the master relay functions to trip it on a reversal of power flow. The master relay and the phase relay act together to close the protector when, and only when, the correct voltage conditions exist across it.

Network protectors are often located outdoors or underground in vaults, thus they must be protected by a sealed enclosure. When approached for service, test, or maintenance, network protectors must be electrically and physically disconnected from the system on both the transformer and the load side. Historically, this consideration dictated the use of a rollout type breaker design which could be disconnected and rolled out of its enclosure for inspection and maintenance. Network fuses which were located within the enclosure on the load or network side of the rollout units, as well as the disconnect links located on the line or transformer side, had to be unbolted after failure using insulated tools and removed from the network protector by hand. This operation presented a potential hazard to maintenance personnel since an accidentally dropped piece of hardware, a tool, a fuse, or disconnect link might fall into the protector, despite a protective barrier system, and come in contact with components at high potential. The resulting arc-over often resulted in injury to maintenance personnel and damage to the equipment.

In order to overcome the limitations of prior art network protectors, it would be desirable to provide a lower cost fused network protector which would allow maintenance with an increased degree of safety and convenience.

SUMMARY OF THE INVENTION

In accordance with the principles of the present invention, there is provided an enclosed circuit interrupter comprising an enclosure, a circuit interrupter mounted within the enclosure, and at least one fuse assembly externally mounted upon the enclosure and connected in series circuit relationship with the circuit interrupter. The fuse assembly comprises a fuse housing of insulating material having an open front and a cover removably mounted across the open front. Terminals are integrally molded within the housing and are adapted to be connected to a fuse inserted through the open front. The other end of the terminals are adapted for electrical connection to the circuit interrupter and to the conductors supplying the load, thus providing a combination fuse holder and insulted feed-through bushing.

The terminals include a mounting structure comprising a plurality of studs, each having a head and a shank, a cap covering the heads and, together with one surface of the terminals, defining a volume surrounding the heads. The volume is filled with a rubber-like material to resiliently position the studs upon the terminals and to permit mounting of a fuse without cracking of the housing due to misalignment between the studs and the fuse.

DESCRIPTION OF THE PREFERRED EMBODIMENT

Figure 1:
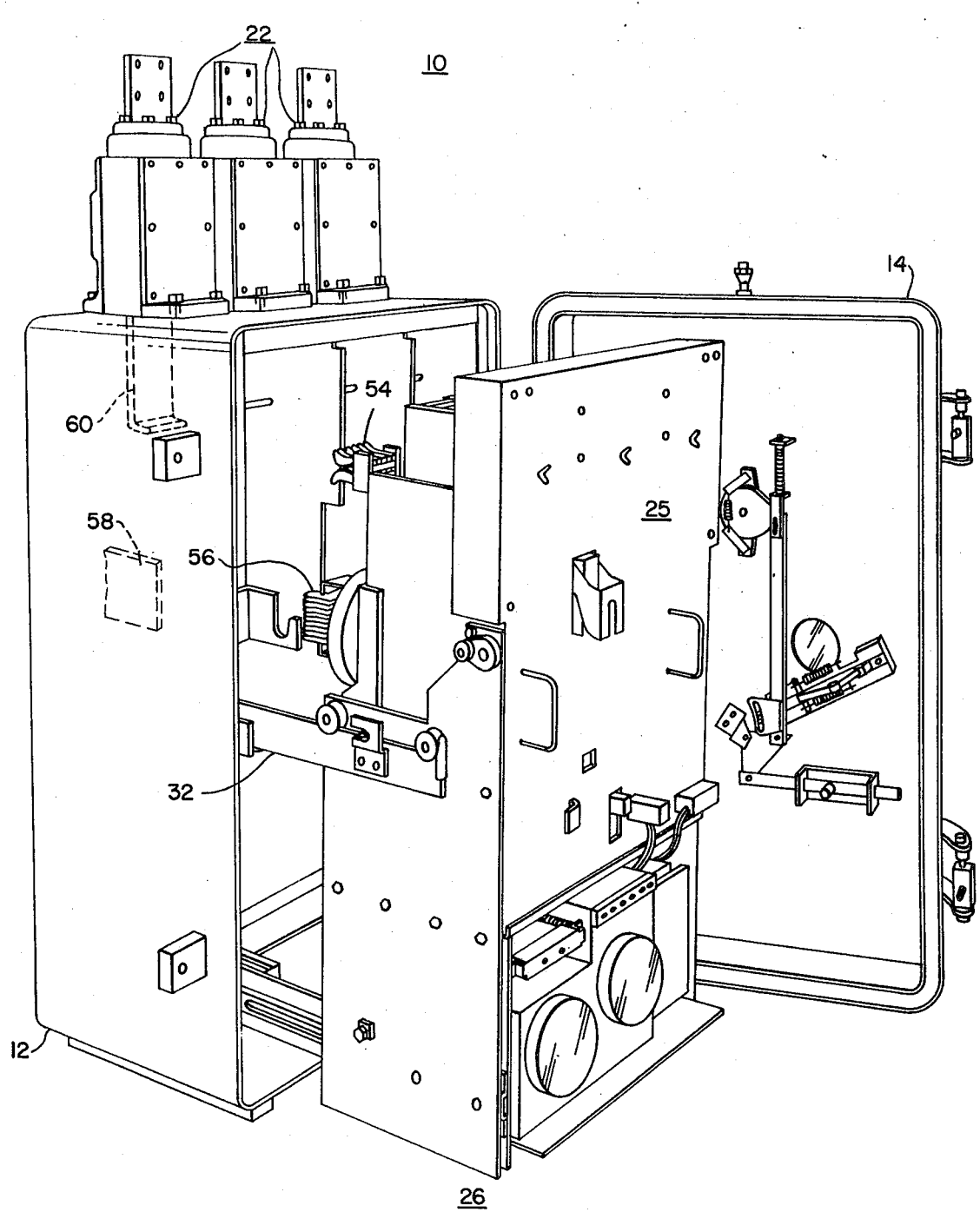
FIG. 1 is a perspective view of a network protector employing the principles of the present invention.
Figure 4:
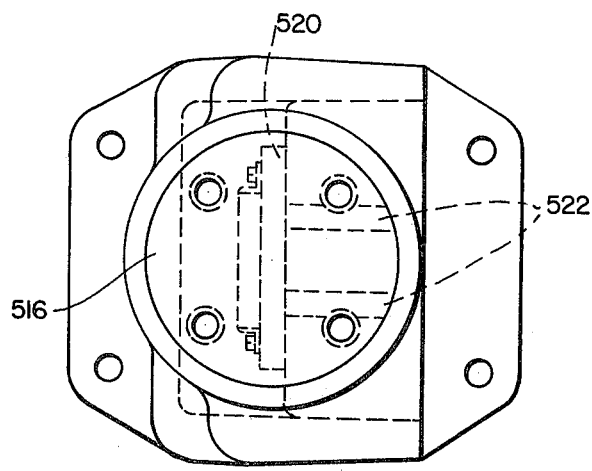
FIG. 4 is a top view of the fuse assembly shown in FIGS. 2 and 3, with the cable connector removed.
Figure 3:
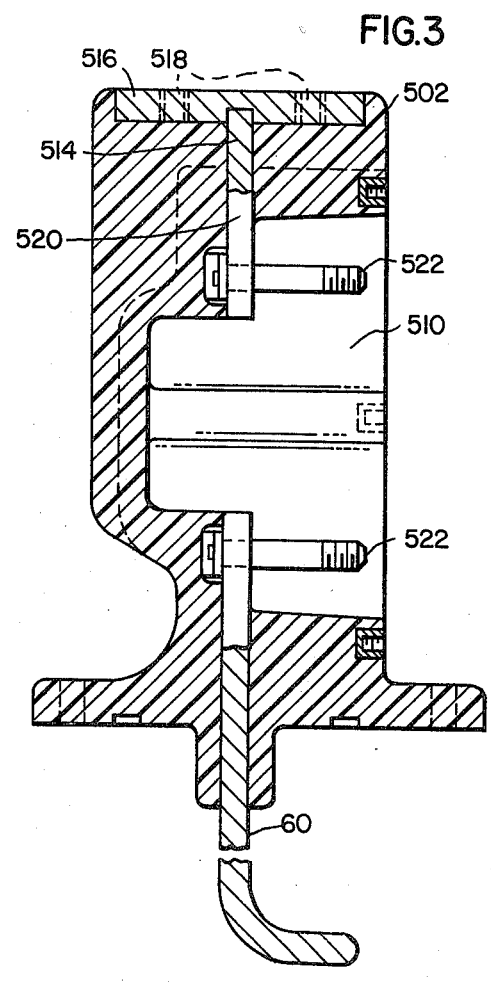
FIG. 3 is a sectional view of the fuse assembly taken along the line III—III of FIG. 2.

Referring now to the drawings, in FIG. 1 there is shown a three-phase network protector 10 employing the principles of the present invention. The network protector 10 includes a metal enclosure 12 and a hinged door 14 which can be closed and tightened to form a watertight seal. A drawout unit 26 including an automatic circuit breaker 25 is shown rolled out on extension rails 32. The circuit breaker 25 includes load disconnects 54 and line disconnects 56 which engage load, or breaker, terminals 60 and line terminals 58 mounted inside the enclosure 12 when the drawout unit 26 is fully inserted into the enclosure 12. In this position, the circuit breaker 25 bridges the load and line terminals 58 and 60. When the contacts of the circuit breaker 25 are closed, current then flows from the line terminals 58 through the line disconnects 56, the circuit breaker 25, the load disconnects 54 to the load terminal 60. As can be seen in FIG. 1, there are three fuse assemblies 22 mounted on the top of the enclosure 12. One fuse assembly 22 is provided for each phase of the network protector 10.

Figure 2:
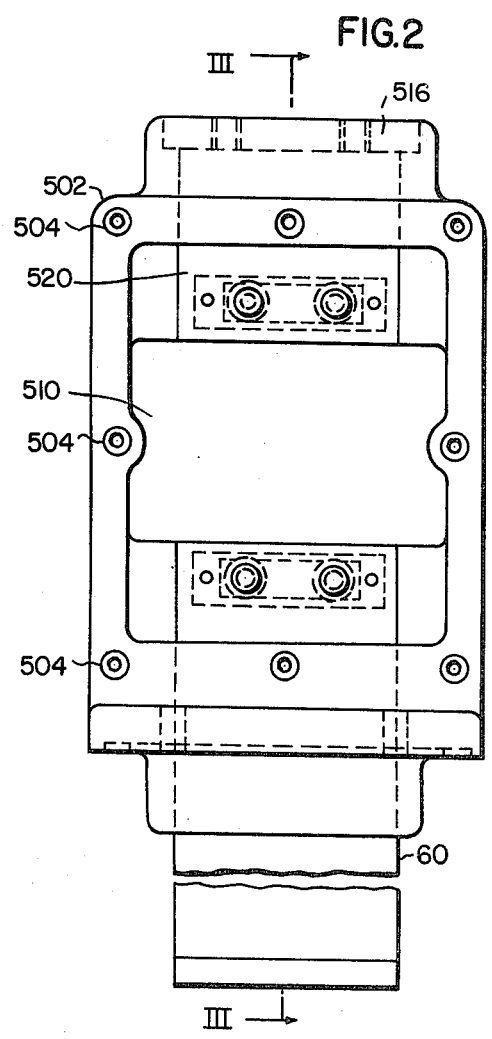
FIG. 2 is a front elevational view of one of the fuse assemblies shown in FIG. 1, with the cover removed.
Figure 6:
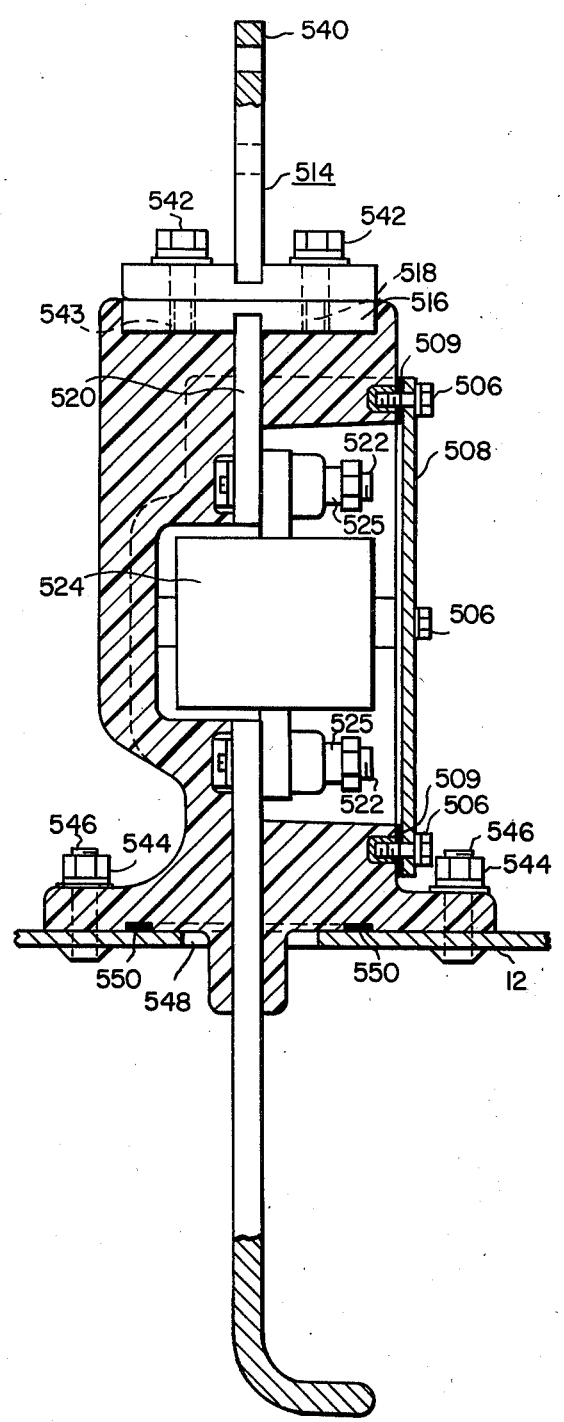
FIG. 6 is a sectional view of the fuse assembly shown in FIG. 5 taken along the line VI—VI of FIG. 5.
Figure 5:
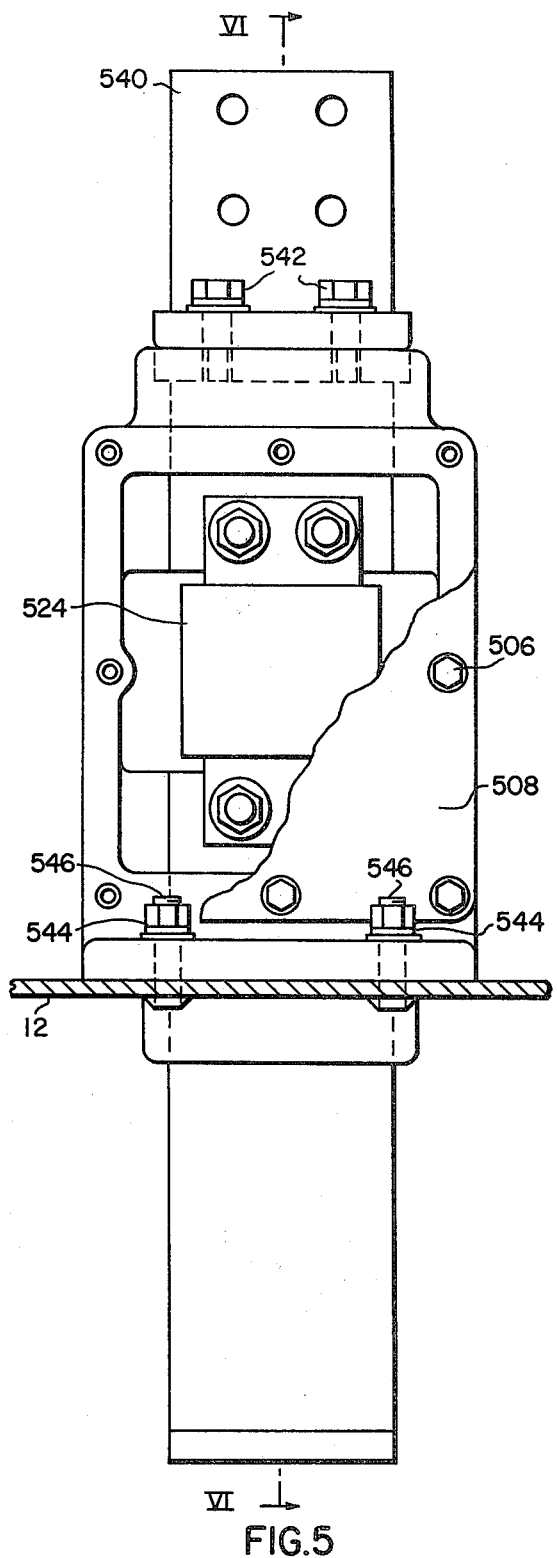
FIG. 5 is a front elevational view of the fuse assembly shown with the cover partially cut away, a fuse
Figure 7:
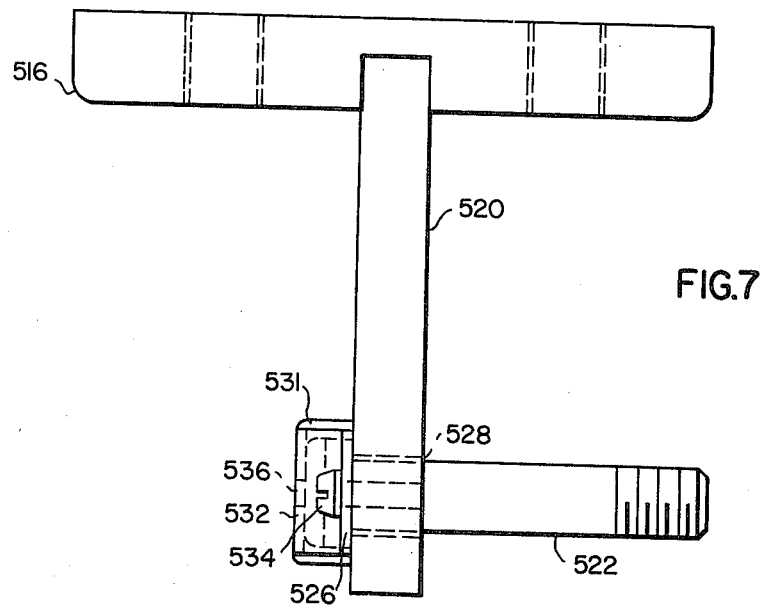
FIG. 7 is a detailed side view of a fuse terminal and mounting stud.
Figure 8:
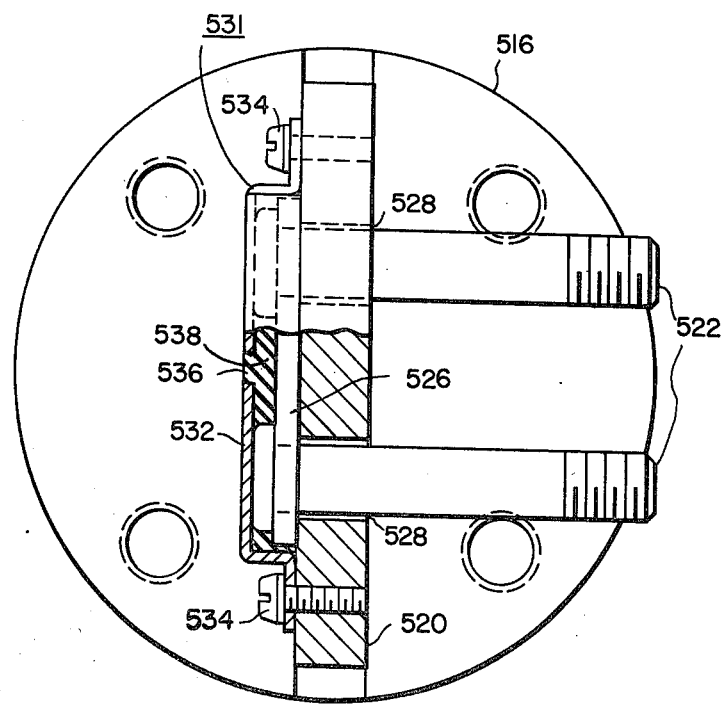
FIG. 8 is a detailed end view of the fuse terminal and mounting studs of FIG. 7 shown partially in section.

Referring now to FIG. 2, each fuse assembly 22 includes a housing 502 of molded insulating material such as epoxy. A plurality of threaded inserts 504 are molded into the housing 502 to cooperate with bolts 506 which are used to mount the cover 508 and gasket 509 as seen in FIG. 6. The housing 502 includes a cavity 510 into which a fuse can be inserted. Integrally molded within the housing 502 is the breaker terminal 60 and a cable terminal assembly 514. The breaker terminal 60 extends through an opening in the network protector enclosure 12 and cooperates with the load disconnects 54 of the circuit breaker 25. The cable terminal assembly 514 includes a round base plate 516 having four threaded holes 518 and a fuse terminal piece 520. The fuse terminal 520 and breaker terminal 60 are each provided with a pair of threaded studs 522 resiliently mounted thereto providing a connecting point for a fuse 524 (FIGS. 5 and 6). As can be seen in FIGS. 7 and 8, the two studs 522 extend through a tie plate 526 which allows each pair of studs 522 to be handled as a unitary structure to aid in the assembly process. The studs 522 also extend through holes 528 in the fuse terminal 520. Covering the heads of the studs 522 is a resilient mounting structure 531 including a metal cap 532 held in place by bolts 534 threaded into the fuse terminal 520. The metal cap 532 includes a hole 536 through which is injected a fluid silicone rubber material 538. The silicone rubber material 538 cures within the metal cap 532 to resiliently position the studs 522 within the fuse terminal 520 prior to molding of the housing 502. The breaker terminal 60 and cable terminal assembly 514 are held in proper position during molding of the housing 502. The silicone rubber material 538 acts also as a seal to prevent the epoxy material from which the housing is molded from entering the resilient mounting structure 531 during the molding process. The studs 522 are thus resiliently molded into the housing 502 to enable them to withstand displacement without cracking during the mounting of a fuse thereupon. This displacement is caused by minor misalignment of the studs 522 and mounting holes through the fuse due to manufacturing tolerances.

In FIGS. 5 and 6 the fuse assembly 22 is shown mounted upon the network protector enclosure 12. The fuse 524 is inserted over the studs 522 and secured to the load terminal 60 and fuse terminal 520 by a combination nut and lock washer 525.

A cable connector 540 is mounted to the base plate 516 by bolts 542 inserted through holes in the cable connector 540 and into the threaded holes 518 of the base plate 516. The cable connectors 540 are of standard design and are adapted for connection to customer service cables.

As can be seen in FIGS. 5 and 6, the fuse assembly 22 is secured to the network protector enclosure 12 by nuts 544 threaded onto studs 546 mounted upon the enclosure 12. The load terminal 60 extends through feed-through aperture 548 in the enclosure. A gasket 550 serves as an internal enclosure pressure seal and to protect the aperture 548 from dust and moisture external to the enclosure 12.

Inspection or replacement of the fuse 524 can be performed by removing the bolts 506 and the cover 508. It is not necessary to open the door 14 of the enclosure 12, thereby eliminating the possibility of dropping tools or components into the network protector mechanism.

The fuse assembly 22 not only provides connection for the fuse 524 but also provides an insulated bushing support for leads extending out of the network protector enclosure 12 toward customer service, and a terminal connection for the customer's cable. By removing the fuse from the interior of the enclosure 12, the heat loss within the enclosure is reduced and the possibility eliminated of any damage or contamination to the circuit breaker components caused by debris from a fuse interruption. In addition, operating personnel are protected from exposure to a fuse interruption while performing maintenance upon the circuit breaker 25 or other components of the drawout unit 26.

The invention is not limited to use with network protectors, but can also be used with other types of enclosed circuit interrupters wherever fuse protection is desired. It can be seen, therefore, that the invention provides a fuse-protected enclosed circuit interrupter which exhibits increased safety, economy, and convenience during maintenance operations.

We claim:

1. An enclosed circuit interrupter comprising:

an enclosure;

a drawout type circuit interrupter mounted within said enclosure;

at least one fuse assembly externally mounted upon said enclosure and adapted to support a fuse to be connected in series circuit relationship with said drawout type circuit interrupter;

said enclosure comprising means defining a feed-through aperture, and said fuse assembly comprising a fuse housing of molded insulating material having a fuse cavity internal thereto, a breaker terminal, and a cable terminal; each of said terminals having first and second ends, said first ends adapted to be connected to a fuse, said second end of said breaker terminal extending through said feed-through aperture and being adapted for connection to said circuit interrupter, said second end of said cable terminal being adapted for connection to a cable; and said breaker and cable terminals being integrally molded within said housing and including at least one stud resiliently mounted within said housing and adapted to engage a fuse.

2. An enclosed circuit interrupter as recited in claim 1 wherein each of said studs extends through a hole in one of said terminals and comprises a head, and said fuse assembly comprises a cap structure defining a volume surrounding each of said heads and a mass of resilient material occupying said volume.

* * * * *